No. 714,890. Patented Dec. 2, 1902.
J. GIESHOIDT.
MANUFACTURE OF SPIRAL SHAPED OR HELICALLY TWISTED BODIES.
(Application filed Jan. 9, 1900.)
(No Model.)

Witnesses: Inventor:
Josef Gieshoidt
per Roester & Briesen
Attorneys.

UNITED STATES PATENT OFFICE.

JOSEF GIESHOIDT, OF DUSSELDORF, GERMANY.

MANUFACTURE OF SPIRAL-SHAPED OR HELICALLY-TWISTED BODIES.

SPECIFICATION forming part of Letters Patent No. 714,890, dated December 2, 1902.

Application filed January 9, 1900. Serial No. 820. (No model.)

*To all whom it may concern:*

Be it known that I, JOSEF GIESHOIDT, a citizen of Germany, and a resident of Dusseldorf, Germany, have invented certain new and useful Improvements in the Manufacture of Various Kinds of Spiral-Shaped or Helically-Twisted Bodies, of which the following is a specification.

The present invention has for its object to manufacture various kinds of spiral-shaped or helically-twisted bodies, such as the raw material for twist-drills, which hitherto had to be shaped by milling-cutters, by a simpler and cheaper process than those previously known.

Figures 1, 2:
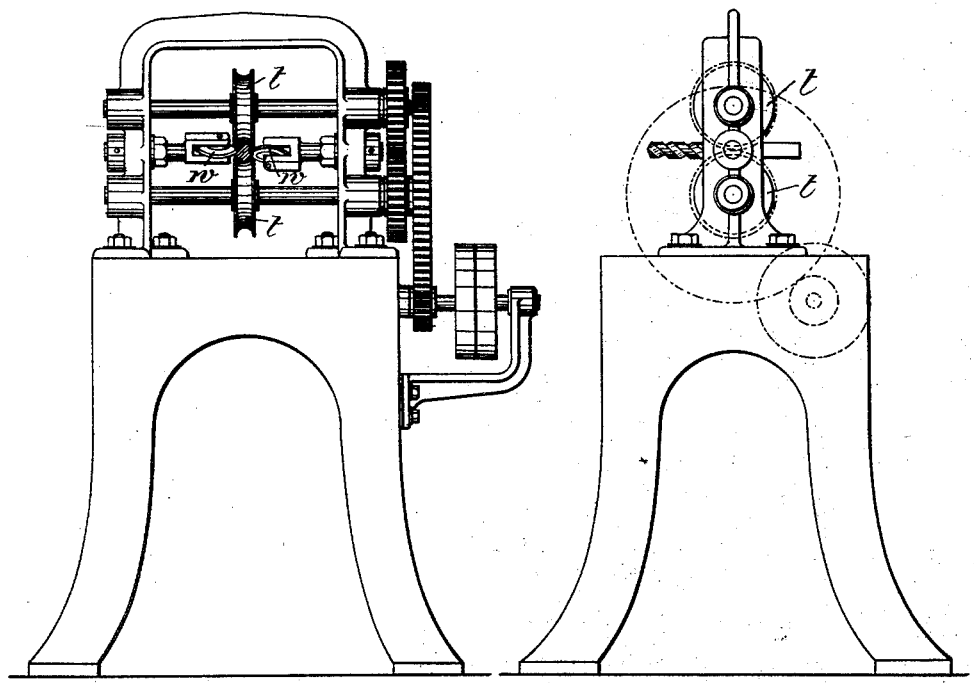
Figure 3:
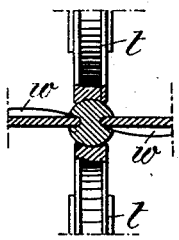

In the accompanying drawings, Figure 1 is a side view of a device embodying my invention. Fig. 2 is an end view of the same, and Fig. 3 is a partial cross-section on a larger scale.

The new device or tool chiefly comprises two kinds of rollers, viz: a set of feed and shaping rollers for transporting and shaping the piece of work and a set of rollers which produce the screw-threads. The two kinds of rollers are adapted to occupy various positions in relation to each other.

In the example represented by the drawings two slightly-grooved feed-rollers rounded off at the circumference and two thread-forming rollers have been adopted. The feed-rollers constitute at the same time shaping-rollers for imparting to a square work-piece a suitably-rounded outline in cross-section. The parallel axes of the feed-rollers $t$ are placed across the longitudinal axis of the piece of work to be rolled, and the thread-forming rollers $w$ are placed somewhat obliquely. These thread-forming rollers $w$ are hung in a pair of forked bearings placed in axial alinement with each other and intermediate the parallel shafts of the rollers $t$.

The two sets of rollers may be situated approximately at the same spot or one behind the other. The piece of work to be operated upon (which has preferably a rectangular cross-section) is seized by the feed-rollers and propelled forward, whereupon the obliquely-placed rollers $w$ cause the said piece to turn and at the same time impart to the screw-thread or to the spiral-shaped body the desired shape, so that in the case of the rolling-mill represented by the drawings the piece of work produced by the same has the shape shown by Figs. 1 and 2 and more clearly by Fig. 3, which is a section through the roller and the piece of work on a larger scale. If only one thread is to be rolled, only one thread-forming roller is employed, and, if necessary, the necessary turning of the piece of work may be effected by a separate appliance. For rolling more than two screw-threads several thread-forming rollers and by preference also several feed-rollers are employed. The rollers are preferably adjustable and easily exchangeable in order that different kinds of work may be produced by the same rolling-mill. The feed-rollers $t$ may be turned on their respective axes by any convenient means.

What I claim is—

In a machine for making spirally-twisted wire, the combination of a pair of parallel shafts extending at right angles to the blank, with grooved feed-rollers mounted upon the shafts, a pair of forked bearings arranged intermediate and in the same plane with the shafts, and thread-forming rollers pivoted to the forked bearings and arranged obliquely to the axis of the blank, substantially as specified.

Signed by me at Dusseldorf, Germany, this 23d day of December, 1899.

JOSEF GIESHOIDT.

Witnesses:
 WILLIAM ESSENWEIN,
 P. LIEBER.